(12) United States Patent
Salahun et al.

(10) Patent No.: US 10,897,164 B2
(45) Date of Patent: Jan. 19, 2021

(54) METHOD OF MANUFACTURING A LAMINATION STACK FOR USE IN AN ELECTRICAL MACHINE

(71) Applicant: SKF Magnetic Mechatronics, Saint-Marcel (FR)

(72) Inventors: Erwan Salahun, Groix (FR); Joaquim Da Silva, Sennely (FR); Bruno Tellier, Saint-Julien-de-la Liegue (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 514 days.

(21) Appl. No.: 15/597,275

(22) Filed: May 17, 2017

(65) Prior Publication Data
US 2017/0338699 A1    Nov. 23, 2017

(30) Foreign Application Priority Data
May 20, 2016    (DE) .................. 10 2016 208 744

(51) Int. Cl.
*H01F 3/04*    (2006.01)
*H01F 7/06*    (2006.01)
(Continued)

(52) U.S. Cl.
CPC .................. *H02K 1/02* (2013.01); *H02K 7/09* (2013.01); *H02K 15/02* (2013.01); *H02K 2201/09* (2013.01)

(58) Field of Classification Search
CPC ............ H02K 1/02; H02K 7/09; H02K 15/02; H02K 2201/09
See application file for complete search history.

(56) References Cited

U.S. PATENT DOCUMENTS 3,512,902 A    5/1970    Emmons et al.
4,085,347 A    4/1978    Lichius
(Continued)

FOREIGN PATENT DOCUMENTS

CA    2624347 A1    9/2008
CN    85106290 A    6/1987
(Continued)

OTHER PUBLICATIONS

Office Action from the Chinese Patent Office dated Nov. 4, 2019 in related Chinese application No. 201710223389, and translation thereof.

(Continued)

*Primary Examiner* — Paul D Kim
(74) *Attorney, Agent, or Firm* — J-Tek Law PLLC; Scott T. Wakeman; Mark A. Ussai

(57) ABSTRACT

The invention relates to a method of manufacturing a lamination stack used in a rotating electrical machine. The method includes providing naked sheets made of ferritic material; preparing both sides of each sheet so as to obtain a determined surface roughness; coating at least one side of each sheet with an chemically protective electrically insulating material; stacking the coated sheets; compressing the stack obtained; heating the compressed stack at a temperature above the melting temperature of the insulating material; and cooling down the compressed stack so as to form an integral lamination stack consisting of alternating sheets of ferritic material and layers of insulating material. The invention also relates to an electrical machine comprising such a lamination stack.

20 Claims, 3 Drawing Sheets

(51) Int. Cl.
*H02K 1/02* (2006.01)
*H02K 7/09* (2006.01)
*H02K 15/02* (2006.01)

(56) References Cited

U.S. PATENT DOCUMENTS

| | | | |
|---|---|---|---|
| 6,379,402 B1 * | 4/2002 | Suhara | H01G 9/155 |
| | | | 29/25.03 |
| 7,160,279 B2 | 1/2007 | Pauley et al. | A61F 13/15 |
| 7,160,297 B2 * | 1/2007 | Nesbitt | A47J 36/025 |
| | | | 427/180 |
| 8,562,851 B2 * | 10/2013 | Kumura | C01G 49/0018 |
| | | | 252/62.59 |
| 9,000,642 B2 * | 4/2015 | Moulin | F16C 32/047 |
| | | | 310/85 |
| 9,203,269 B2 * | 12/2015 | Andonian | H02K 1/04 |
| 2007/0200443 A1 | 8/2007 | Baudelocque et al. | |
| 2008/0246365 A1 | 10/2008 | Wilsdorf | |
| 2011/0175358 A1 | 7/2011 | Langson | |
| 2014/0062253 A1 | 3/2014 | Andonian | |
| 2014/0284930 A1 | 9/2014 | Langson | |
| 2016/0226332 A1 | 8/2016 | Bauce et al. | |

FOREIGN PATENT DOCUMENTS

| | | | |
|---|---|---|---|
| CN | 102782262 A | 11/2012 | |
| FR | 2888390 A1 | 1/2007 | |
| JP | 2000144204 | 5/2000 | H01F 1/34 |
| JP | 2000144204 A * | 5/2000 | |

OTHER PUBLICATIONS

Search Report from the Chinese Patent Office dated Oct. 27, 2019 in related Chinese application No. 201710223389, and translation thereof.

* cited by examiner

METHOD OF MANUFACTURING A LAMINATION STACK FOR USE IN AN ELECTRICAL MACHINE

CROSS REFERENCE TO RELATED APPLICATIONS

This application claims priority to German patent application no. 102016208744.4 filed on May 20, 2016, the contents of which are fully incorporated herein by reference.

FIELD OF THE INVENTION

The present invention relates to the field of rotating electrical machines, such as magnetic bearings, which comprise a magnetic bearing stator, a magnetic bearing rotor and position sensors. More specifically, the invention is directed to a method of manufacturing a lamination stack for use in a rotating electrical machine that operates in a corrosive environment or is required to be NACE-compliant.

BACKGROUND OF THE INVENTION

The use of magnetic bearings in machines such as turbo-expanders and compressors is becoming increasingly common, due to the advantages associated with being able to operate the bearing in the process gas of the machine, without the need for sealing. The bearing stator generally includes stator laminations incorporated within stator poles and copper wings. When energized, the bearing stator tends to attract the bearing rotor, on the basis of the Lenz-Faraday principle. The bearing rotor also comprises laminations made of soft magnetic material. The laminations are often referred to as lamination stacks and are advantageously made of soft magnetic material with excellent magnetic properties. Silicon-iron is a material that is commonly used in lamination stacks. In a corrosive environment, however, such a material cannot be used without protective measures.

One commonly applied protective measure is to encapsulate the bearing stator and the bearing rotor, so as to isolate them from the process gas.

To protect the rotor laminations and rotor shaft, a solution is proposed in CA02624347 in which selected exposed surfaces of the rotor shaft are provided with a barrier layer. The application of the barrier layer increases the complexity and thus the cost of the manufacturing process.

In U.S. Pat. No. 9,000,642, a solution is proposed in which the stator is encapsulated by a corrosion resistant jacket and the rotor laminations are made of a magnetic anti-corrosion material such as ferritic stainless steel. The encapsulation of the stator enables the use of silicon-iron stator laminations, but the airgap has to be enlarged in order to insert the jacket, which decreases the magnetic properties such as field sensitivity of such devices (actuator, sensor). Also, while the use of ferritic stainless for the rotor laminations enables the rotor to function unshielded in the process gas, there is a compromise with regard to the magnetic properties.

FR2888390 disclosed a method of making a laminated magnetic circuit comprising a stack of sheets of a ferromagnetic material onto which an adhesive is applied by silkscreen, then stacking the sheets, and then compressing the stack thus obtained to harden the adhesive. Such a laminated magnetic circuit cannot be used in a corrosive environment.

Consequently, there is room for improvement.

BRIEF SUMMARY OF THE INVENTION

The present invention defines a method of producing a lamination stack which has excellent corrosion resistance and excellent magnetic properties, so that the lamination stack may be used unshielded in a rotating electrical machine that operates in a corrosive environment.

The method comprises steps of:
providing naked sheets made of ferritic material;
preparing both sides of each sheet so as to obtain a determined surface roughness;
coating one side of each sheet with a chemically protective, electrically insulating material;
stacking the coated sheets;
compressing the stack thus obtained;
heating the compressed stack at a temperature above the melting temperature of the insulating material; and
cooling down the compressed stack so as to form an integral lamination stack consisting of a succession of alternating sheets of ferritic material and layers insulating material.

In a preferred embodiment of the invention, the ferritic material is a ferritic stainless steel having an alloy composition in accordance with AISI 444 or EN 1.452.

In a further preferred embodiment, the coating of each sheet is done as follows: firstly the chemically protective electrically insulating material is disposed on the sheet in the form of solid powder, then the sheet is heated up at a temperature above the melting point of the chemically protective electrically insulating material, and finally the sheet is cooled down in ambient air.

In a still further preferred embodiment of the invention, the preparation of both sides of each sheet is performed by a chemical attack, such as by immersion into a hydrofluoric acid bath.

In a still further preferred embodiment of the invention, the chemically protective, electrically material is a fluoropolymer, preferably Fluorinated Ethylene Propylene, because this material doesn't react chemically with processed gas.

In a still further preferred embodiment of the invention, each sheet of ferritic material has a thickness of between 0.05 and 3.0 mm, and each layer of chemically protective electrically insulating material has a thickness between 5 and 100 microns.

In a still further preferred embodiment of the invention, the compression force applied during the compression of the stack is between 80 and 200 MPa.

The present invention further defines an electrical machine that is equipped with a lamination stack produced according to the method of the invention. In one example, the electrical machine comprises a magnetic bearing and the lamination stack forms part of the rotor and/or stator assembly of the magnetic bearing.

As a result of the excellent corrosion resistance, the electrical machine may operate in a corrosive environment with a high degree of efficiency. Other advantages of the invention will become apparent from the following detailed description and accompanying drawings.

DETAILED DESCRIPTION OF THE INVENTION

Figure 1:
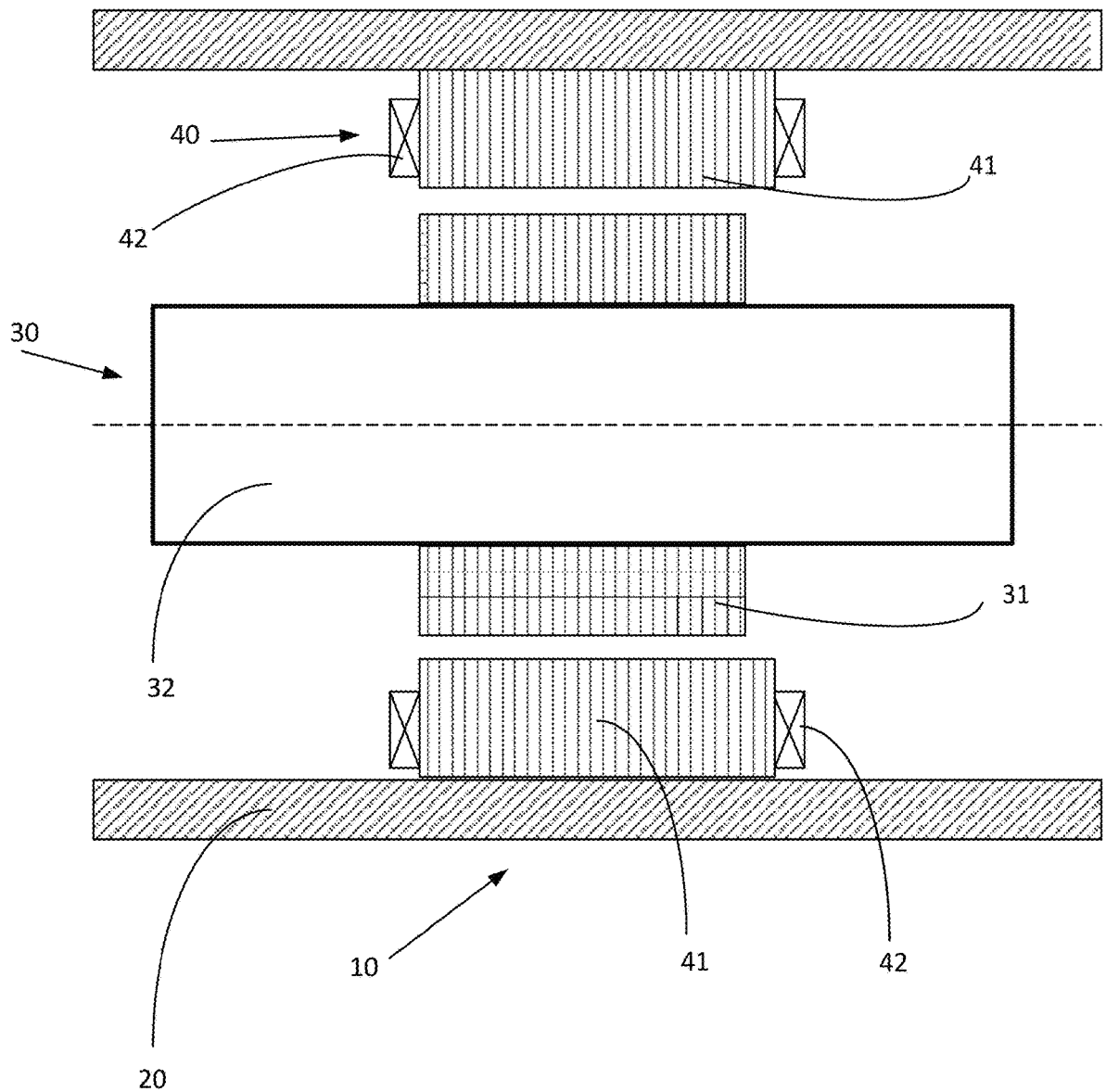
FIG. 1 shows a cross-sectional view of an example of an electrical machine that comprises lamination stacks manufactured using the method of the invention.
Figure 2:
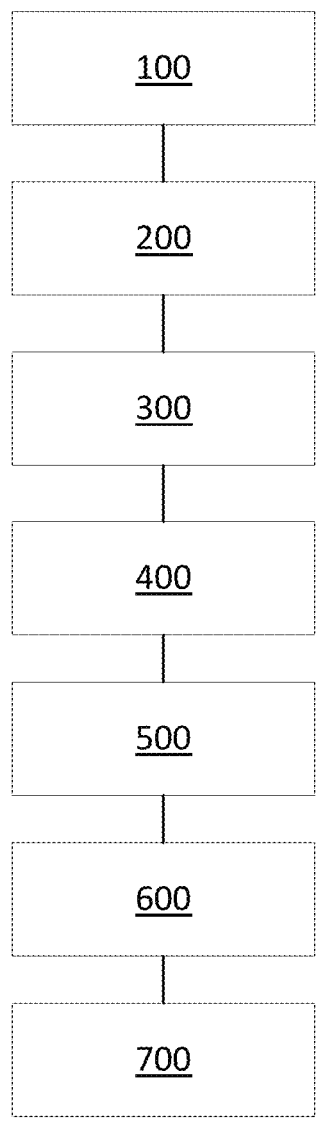
FIG. 2 shows a flowchart of the method of the invention.

An example of part of a magnetic bearing assembly is shown in FIG. 1, the assembly 10 comprising a housing 20 in which a rotor 30 is rotationally supported by a magnetic bearing. The magnetic bearing comprises a stator 40 mounted to the housing 20 and disposed about the rotor 30. The stator 40 includes a lamination stack 41 and electromagnetic windings 42, which are wound so as to create a magnetic field when supplied with electric current. The rotor 30 comprises a rotor shaft 32 and a rotor lamination stack 31 which is mounted on the rotor shaft 32 and aligned with and disposed in magnetic communication with the stator 40. When appropriately energized, the stator 40 is effective to maintain the rotor lamination stack 31 in an unstable equilibrium, so as to provide levitation and radial placement of the rotor shaft 32.

The lamination stacks of the stator 41 and the rotor 31 are made of ferritic or ferromagnetic material.

Such ferromagnetic material can for instance be Si-Iron, Co-Iron or Ni-Iron.

Let us assume that the depicted assembly 10 is part of a system that operates in a corrosive environment, such as turbo expander-compressor system applied in the oil and gas extraction sector. In order to improve the corrosion resistance of the rotor laminated stack 31 and of the stator lamination stack 41, it is advantageous to use a ferritic stainless steel. In a preferred embodiment the ferritic stainless steel has a composition according to AISI 444 or EN 1.4521.

This ferritic stainless steel has an alloy composition that includes:
≤0.025 wt. % carbon (C)
17.0-20.0 wt. % chromium (Cr)
1.75-2.50 wt. % molybdenum (Mo)
from 0.5 to 1.0 wt. % silicon (Si)
from 0.3 to 1.0 wt. % manganese (Mn)
from 0 to 0.8 wt. % niobium (Nb)
from 0 to 0.8 wt. % titanium (Ti)
from 0 to 0.04 wt. % phosphorous (P)
from 0 to 0.03 wt. % sulphur (5)
from 0 to 0.035 wt. % nitrogen (N)
with the balance being iron (Fe), including unavoidable impurities.

For efficient functioning of the magnetic bearing, it is also important that the lamination stacks 41, 31 have good magnetic properties. High relative permeability and high saturation magnetization are particularly important properties. These properties are optimized thanks to a special heat treatment, which maximises the magnetic properties of the ferritic stainless steel without compromising the corrosion resistance, the mechanical properties or electrical resistivity.

The heat treatment consists of annealing at a temperature in excess of 900° C. followed by rapid quenching. This produces a microstructure that has fewer precipitates than the untreated base material. Furthermore, the annealing step induces grain growth, which is thought to enhance the magnetic character of the alloy. Moreover, the electrical resistivity of the material is not affected by the thermal treatment. This is an important parameter, as it is linked to eddy current losses.

Moreover, when ferritic stainless steel is used at elevated temperature, deleterious phases such as chi ($\chi$) sigma ($\sigma$) and mu ($\mu$) phases can precipitate. These phases are in equilibrium in a thermodynamic phase diagram and need time to diffuse. It is therefore important that the material does not reside long (a few minutes, 10 minutes at max, preferably 5 minutes) in the annealing temperature range where these phases are formed.

The rotor lamination stack 31 and/or the stator lamination stack 41 is manufactured according to a method that will now be described.

In a first step 100, naked sheets of a ferritic material are obtained, e.g. by stamping and cutting material from rollers of raw material in the case of metallic ferritic material. The geometry of the sheets, in particular their thickness, depends mainly on the desired type of lamination stack, e.g. either for a rotor or for a stator, and on the size and power of the electrical machine to be equipped with the stack.

For a magnetic bearing to be used in an Oil & Gas extractor, the thickness of the sheets is typically between 0.05 and 3 mm, and preferably between 0.1 and 0.3 mm, in order to avoid eddy currents in bearings.

In a second step 200, both sides of each sheet are prepared so as to obtain a determined surface roughness. Indeed, it is essential that asperities 80 are present on the surfaces of the naked sheets 60. These asperities must be in a large enough quantity and their heights and widths shall be of the order of magnitude of the micron. Typically, the heights and widths of the asperities are of about 2 microns.

Depending on the ferritic raw material used and its manufacturing process, there may be the need to prepare the surfaces so as to create the asperities 80 with dimensions mentioned above. For instance, typically with a ferritic stainless steel material, the surface roughness is too smooth and needs to be increased. Traditional sand blasting is unsuitable, as it would make the surface too rough by creating excessively large asperities.

According to the invention, the surfaces are prepared thanks to a chemical attack consisting of an immersion of the naked sheets in a corrosive liquid bath.

Advantageously, the corrosive liquid is a water solution based on hydrofluoric acid. A quick bath of about half an hour at room temperature suffices to create asperities of optimum dimensions.

Figure 4:
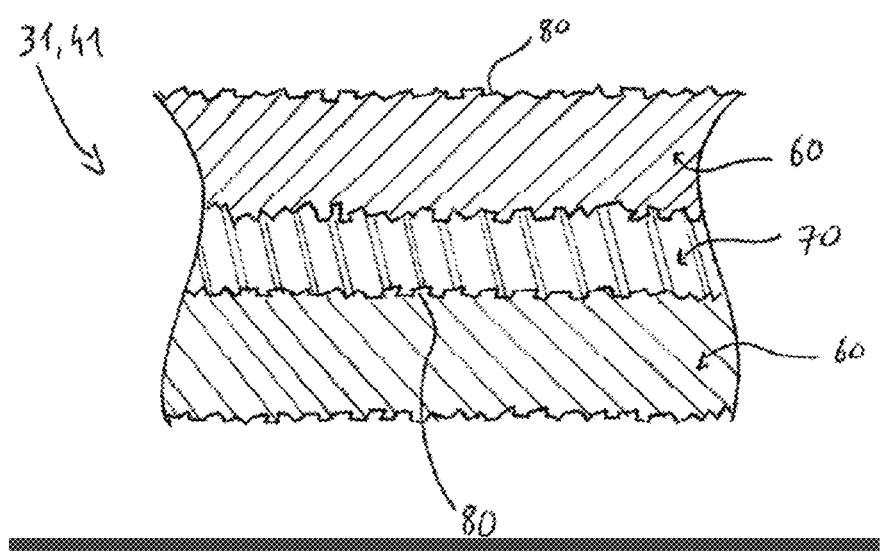
FIG. 4 shows a magnified view of a detail of the lamination stack obtained according to the invention.

The sheets 60 are then removed from the bath and cleaned so as to remove any particle of corrosive liquid. The asperities 80 are visible on FIG. 4 where they have been exaggerated for the sake of clarity.

In a third step 300 of the method of the invention, a chemically protective, electrically insulating material is deposited on at least one side of each sheet 60.

Advantageously, this material is a fluoropolymer, a material with excellent ability to resist the chemical aggression of agents such as H2S, NaCl and CO2. In particular, this material may be a Fluorinated Ethylene Propylene (FEP) or Perfluoroalkoxy Alkane (PFA), rather than Polytetrafluoroethylene (PTFE).

The electrically insulating and chemically protective material may have the form of a very thin solid powder with grains of a few microns size (typically 5 to 10 microns), and is deposited on the sheets according to a known method such as pneumatic pulverisation or electrostatic deposition. Alternatively, a colloidal solution can be applied on the surfaces.

Each sheet 60 is then placed in an oven or under heating lamps at the temperature exceeding the melting temperature of the insulating material for about an hour at maximum, so as to melt the grains. For instance, in the case of FEP, which has a melting temperature of 260° C., the sheets 60 are heated and maintained at a temperature of about 270° C. during approximately thirty minutes. This heating temperature is low enough so as not to change the metallurgical structure of the ferritic stainless steel AISI 444 and to avoid undesired precipitates as mentioned earlier.

Once melted the insulating material flows into or around the asperities 80. Upon cooling, preferably in the ambient air, the insulating material solidifies and guarantees a good mechanical anchorage of the insulating material onto the sheets 60. Hence, coated sheets are obtained, the layer 70 of insulating material being very thin and uniform all over the face of the sheet. The thickness of the layer obtained according to the method of the invention is between 5 and 20 microns, depending on the desired properties of the lamination stack.

Therefore, thanks to the invention, no glue is used to maintain the layer of insulating material 70 onto the ferritic sheet 60.

In the case where only one face of each sheet 60 is to be covered by a layer 70 of insulating material, it is advantageous to use a coloured insulating material, so that the side covered is easily recognizable during the following step according to the invention. In the case where the basic insulating material is not coloured (this is the case for FEP), a coloured organic pigment is be added during the preparation of the raw insulating material.

In the case where the two faces of each sheet 60 is to be covered by a layer of insulating material, the use of a coloured organic pigment allows to easily control optically the presence of the insulating material.

It is important to avoid the usage of colouring particles which could create electrical bridges between the sheets and hence the propagation of eddy currents. An organic colouring pigment is therefore appropriate.

Figure 3:
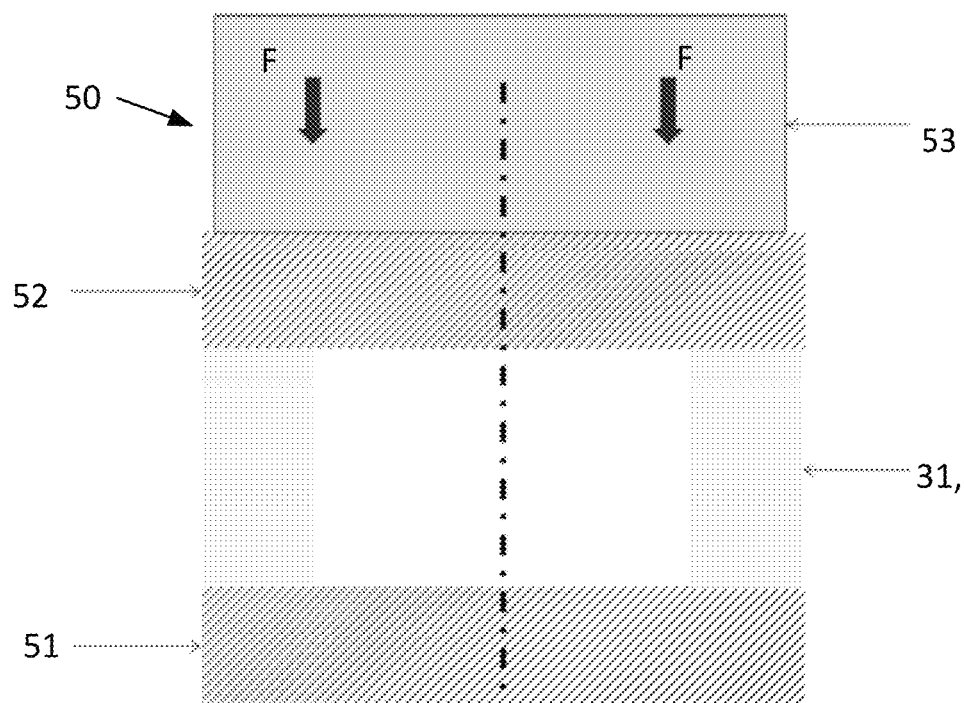
FIG. 3 shows how the step of compression of the stack according to the invention is performed, with a dedicated compression tool.

In a fourth step 400 of the method of the invention, the coated sheets are then stacked in a compression tool 50 represented on FIG. 3, between a lower frame 51 and upper frame 52. It is important that the coated sheets are placed horizontally so as to be perpendicular to the gravity field. For sheets with a layer of insulating material 70 on only one side, it is important that the covered side is the top one.

In a fifth step 500 of the method of the invention, a compressor 53 is then placed above the upper frame and applies a determined compression force F onto the stacked coated sheets. The direction of the compression force F is perpendicular to the stacked coated sheets. Thanks to the compression force, air bubbles which may have been created between the coated sheets during the stacking operation are expelled. Another advantage of the compression force is to minimise the distance between the sheets 60 of ferritic material while ensuring that there is always some insulating material between two consecutive sheets. Also, thanks to the compression force, a proper parallelism between the sheets 60 of ferritic material is obtained.

The magnitude of the compression force depends on the dimensions and the number of stacked coated sheets. Typically, this compression force is chosen in the range from 80 to 200 MPa. The force is built thanks to a hydraulic press. The compression tool 50 further comprises bolts and nuts which are then screwed together until they have taken up completely the compression force F. The hydraulic press is then removed.

In a sixth step 600 of the method of the invention, while maintaining the compression force on the stacked coated sheets thanks to the bolts and nuts, the assembly thus obtained is heated up and maintained at a temperature above the melting temperature of the insulating material for a few hours, a time long enough to make sure that each point of the assembly reaches the desired temperature. When FEP is used, duration of between 5 and 8 hours at 350° C. is recommended. The temperature at which the compressed stacked coated sheets are maintained shall however be lower than a temperature at which an undesirable intermetallic phase appears.

When one layer 70 of insulating material belonging to a coated sheet is in direct contact with a naked sheet 60, the insulating material melts and flows into or on the asperities 80 of the naked sheet 60.

When two layers of insulating material belonging to two consecutive coated sheets are in contact, the melted insulating material of both mixes so as to form only one melted layer with melted material still present in or on the asperities of both sheets.

In a seventh step 700 of the method of the invention, the compressed assembly is then cooled down in the ambient air. During the cooling, the electrical and chemical insulating material solidifies and renders the stack of lamination unitary and rigid thanks to the mechanical anchorage of the insulating material in or on the asperities of the ferritic sheets. No glue or adhesive is used to obtain this result.

The use of solid grains of only a few microns size of chemically protective, electrically insulating material permits to deposit a minimum quantity of it on the naked ferritic sheets, so as to form a layer of a minimum thickness, of about 5 to 20 microns, large enough just to isolate electrically two consecutive ferritic sheets and to ensure the mechanical stiffness of the lamination stack.

If necessary, further machining operations can be performed on the lamination stack obtained by a method according to the invention, in order to give the stack its final dimensions.

Consequently, a lamination stack that is formed according to the invention has an optimal combination of magnetic properties, mechanical properties and corrosion resistance.

The invention has been described for its use in magnetic bearings. However, it can be implemented for any other type of rotating electrical machine such as a motor, an alternator or a generator.

NOMENCLATURE

10 assembly
20 housing
30 rotor
31 rotor lamination stack
32 rotor shaft
40 stator
41 stator lamination stack
42 stator electromagnetic windings
50 compression tool
51 lower frame
52 upper frame
53 compressor
60 sheet
70 layer of chemically protective insulating material
80 asperities
F compression force

The invention claimed is:

1. A method of manufacturing a lamination stack for use in a rotating electrical machine, the method comprising:
providing naked sheets made of ferritic material;
preparing both sides of each naked sheet to obtain a determined surface roughness;
coating at least one roughened side of each naked sheet with a chemically protective electrically insulating material;
stacking the coated sheets;
compressing the stack of coated sheets;
heating the compressed stack of coated sheets at a temperature above a melting temperature of the chemically protective electrically insulating material; and
cooling the compressed stack to form an integral lamination stack comprising sheets of ferritic material alternating with layers of the chemically protective electrically insulating material.

2. The method according to claim 1, wherein the preparing both sides of each naked sheet comprises performing a chemical attack.

3. The method according to claim 1, wherein the compressing the stack comprises compressing the stack with a compression force of between 80 and 200 MPa.

4. The method according to claim 1, wherein the chemically protective electrically insulating material is a fluoropolymer.

5. The method according to claim 1, wherein each sheet of ferritic material has a thickness of between 0.05 and 3.0 mm, and each of the layers of the chemically protective electrically insulating material has a thickness between 5 and 100 microns.

6. The method according to claim 1, wherein the ferritic material is a ferritic stainless steel having an alloy composition in accordance with AISI 444 or EN 1.452, and further comprising a step of heat treating the naked sheets in order to enhance their magnetic properties before the preparing.

7. The method according to claim 1, wherein the chemically protective electrically insulating material comprises fluorinated ethylene propylene.

8. The method according to claim 1,
wherein the preparing both sides of each naked sheet comprises immersing each naked sheet in a hydrofluoric acid bath,
wherein the coating at least one roughened side of each naked sheet comprises:
a. dispersing the chemically protective electrically insulating material on the roughened surface of each naked sheet, the chemically protective electrically insulating material being in the form of solid powder,
b. then heating the each sheet having the chemically protective electrically insulating material dispersed thereon to a temperature above the melting point of the chemically protective electrically insulating material, and
c. then cooling the each sheet having the melted chemically protective electrically insulating material thereon in ambient air,
wherein compressing the stack comprises compressing the stack with a compression force of between 80 and 200 MPa,
wherein the chemically protective electrically insulating material is a fluorinated ethylene propylene, and
wherein each sheet of ferritic material has a thickness of between 0.05 and 3.0 mm, and each layer of the chemically protective electrically insulating material has a thickness between 5 and 100 microns.

9. A method of manufacturing a lamination stack for use in a rotating electrical machine, the method comprising:
providing naked sheets made of ferritic material;
preparing both sides of each naked sheet to obtain a determined surface roughness;
coating at least one roughened side of each naked sheet with a chemically protective electrically insulating material;
stacking the coated sheets;
compressing the stack of coated sheets;
heating the compressed stack of coated sheets at a temperature above a melting temperature of the chemically protective electrically insulating material; and
cooling the compressed stack to form an integral lamination stack comprising sheets of ferritic material alternating with layers of the chemically protective electrically insulating material,
wherein the coating at least one roughened side of each naked sheet comprises:
a. dispersing the chemically protective electrically insulating material on the roughened surface of the each naked sheet, the chemically protective electrically insulating material being in the form of solid powder,
b. then heating the each sheet having the chemically protective electrically insulating material dispersed thereon to a temperature above the melting point of the chemically protective electrically insulating material, and
c. then cooling the each sheet having the melted chemically protective electrically insulating material thereon in ambient air.

10. The method according to claim 9, wherein the compressing the stack comprises compressing the stack with a compression force of between 80 and 200 MPa.

11. The method according to claim 9, wherein the chemically protective electrically insulating material is a fluoropolymer.

12. The method according to claim 9, wherein each sheet of ferritic material has a thickness of between 0.05 and 3.0 mm, and each of the layers of the chemically protective electrically insulating material has a thickness between 5 and 100 microns.

13. The method according to claim 9, wherein the ferritic material is a ferritic stainless steel having an alloy composition in accordance with AISI 444 or EN 1.452, and further comprising a step of heat treating the naked sheets in order to enhance their magnetic properties before the preparing.

14. The method according to claim 9, wherein the chemically protective electrically insulating material comprises fluorinated ethylene propylene.

15. A method of manufacturing a lamination stack for use in a rotating electrical machine, the method comprising:
providing naked sheets made of ferritic material;
preparing both sides of each naked sheet to obtain a determined surface roughness;
coating at least one roughened side of each naked sheet with a chemically protective electrically insulating material;
stacking the coated sheets;
compressing the stack of coated sheets;
heating the compressed stack of coated sheets at a temperature above a melting temperature of the chemically protective electrically insulating material; and
cooling the compressed stack to form an integral lamination stack comprising sheets of ferritic material alternating with layers of the chemically protective electrically insulating material, wherein the preparing both sides of each naked sheet comprises immersing each naked sheet in a hydrofluoric acid bath.

16. The method according to claim 15, wherein the compressing the stack comprises compressing the stack with a compression force of between 80 and 200 MPa.

17. The method according to claim 15, wherein the chemically protective electrically insulating material is a fluoropolymer.

18. The method according to claim 15, wherein each sheet of ferritic material has a thickness of between 0.05 and 3.0 mm, and each of the layers of the chemically protective electrically insulating material has a thickness between 5 and 100 microns.

19. The method according to claim 15, wherein the ferritic material is a ferritic stainless steel having an alloy composition in accordance with AISI 444 or EN 1.452, and further comprising a step of heat treating the naked sheets in order to enhance their magnetic properties before the preparing.

20. The method according to claim 15, wherein the chemically protective electrically insulating material comprises fluorinated ethylene propylene.

\* \* \* \* \*